Sept. 9, 1947.        A. W. SEAR .         2,427,231
COMPENSATION OF FREQUENCY VARIATION OF OSCILLATOR
CAUSED BY CHANGE IN VOLTAGE SOURCE
Filed Nov. 10, 1943

Inventor:
Arthur W. Sear,
by *Harry E. Dunham*
    His Attorney.

Patented Sept. 9, 1947

2,427,231

UNITED STATES PATENT OFFICE 2,427,231

COMPENSATION OF FREQUENCY VARIATION OF OSCILLATOR CAUSED BY CHANGE IN VOLTAGE SOURCE

Arthur W. Sear, Stratford, Conn., assignor to General Electric Company, a corporation of New York Application November 10, 1943, Serial No. 509,687

4 Claims. (Cl. 250—36)

My invention relates to oscillation generators and, more particularly, to electronic oscillation generators of the reactance tube type having a unidirectional current supply source, such as a battery, which is subject to voltage variation.

In portable radio transmitting and receiving equipments, it is customary to make use of batteries as a source of direct current supply. Difficulties are frequently experienced in such equipment as a result of the fact that the output voltage of a battery is ordinarily not constant, but is subject to fluctuations, and especially to gradual decrease as the energy of the battery is depleted. For example, in signal generators comprising an electronic oscillator having an electron discharge reactance device in its frequency determining circuit, considerable decrease in plate voltage of the reactance device is experienced during the life of the battery. Such change in plate voltage produces a change in the mutual conductance and, hence, in the effective reactance of the reactance device, thereby to change the frequency of the oscillator. Difficulties of this nature are particularly pronounced in frequency modulation signal generating apparatus wherein it is desirable to generate a mean or center frequency of constant value.

Accordingly, it is a general object of my invention to provide means for rendering the frequency of a reactance tube controlled electron oscillator substantially independent of voltage variations of the direct current supply source.

It is one specific object of my invention to provide an improved frequency modulation signal generator of the reactance tube controlled type having a mean or center frequency substantially independent of voltage variations of the direct current supply source.

According to my invention, means are provided for supplying to the electron discharge reactance device a negative bias potential proportional in magnitude to the intensity of plate voltage supplied to the device from the battery. Such variable negative bias potential is arranged to compensate for reactance variations of the reactance device otherwise tending to result from variations in plate voltage.

Figure 1:
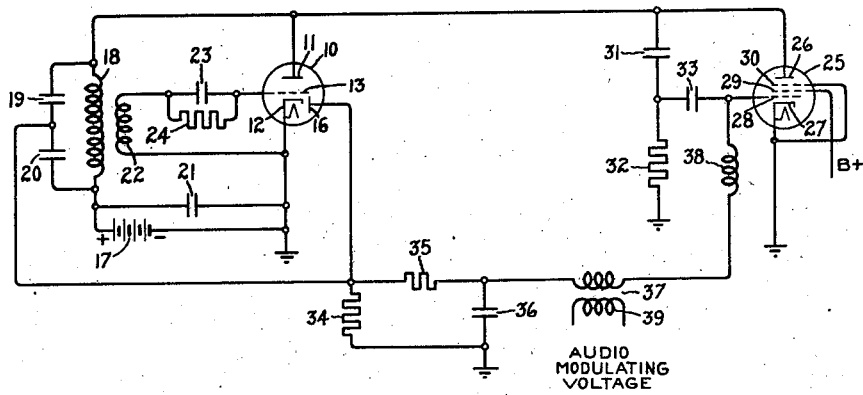
Figure 2:
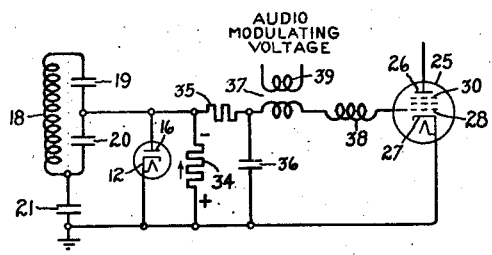

The nature of my invention and its mode of operation will be more fully understood and its objects and advantages further appreciated by referring now to the following detailed specification taken in conjunction with the accompanying drawings, in which Fig. 1 is a schematic circuit diagram of an electronic oscillation generator embodying my invention, and Fig. 2 is a simplified schematic circuit diagram of the grid bias circuit for the reactance tube shown at Fig. 1.

At Fig. 1, I have shown my invention applied, by way of illustration only, to a frequency modulation signal generator comprising a reactance tube controlled oscillator and means for modulating the frequency of oscillation of the oscillator in accordance with a desired signal. As illustrated at Fig. 1, the signal generator comprises an electron discharge device 10 connected as an oscillation generator and comprising an anode 11, a cathode 12, a control electrode 13, and an auxiliary anode 16 disposed to function in conjunction with the cathode 12 as a diode rectifier. The discharge device 10 thus comprises a triode and a diode mounted within the same evacuated envelope. It will, of course, be understood that, if desired, the diode elements of the discharge device 10 may be disposed within a separate evacuated envelope, and that the multiple discharge device, shown by way of illustration, is not an essential feature of my invention.

The cathode 12 of the discharge device 10 is grounded and connected to the negative terminal of a source of direct current supply, such as a battery 17. The positive terminal of the battery 17 is connected to the anode 11 of the device 10 through a tuned circuit comprising an inductance 18 and a pair of serially connected condensers 19 and 20 connected in parallel circuit relation with the inductance 18. A by-pass condenser 21 is connected across the terminals of the battery 17 to provide a path for alternating current generated within the discharge device 10.

To render the discharge of the device 10 oscillatory in nature, the control grid 13 is connected to the cathode 12 through a circuit including an inductance 22 in inductive relation with the inductance 18. The grid circuit of the discharge device 10 also includes a condenser 23 connected in parallel circuit relation with a resistor 24 and in series with the inductance 22 to provide a grid leak bias potential upon the control electrode 13. It is well understood by those skilled in the art that, by reason of the magnetic coupling of the control grid 13 to the tuned anode circuit, the discharge device 10 produces oscillations in the circuit 18, 19, 20 having a frequency determined by the resonant frequency of the anode circuit including the inductance 18 and the capacitors 19 and 20. For the purpose of controlling the resonant frequency of the frequency determining circuit, I have shown connected between the anode of the discharge device 10 and ground a second electron discharge device 25 connected to provide between its anode 26 and cathode 27 an apparent reactance having an instantaneous value controllable in accordance with the instantaneous potential of a control grid 28. The discharge device 25 may, if desired, be provided also with a screen grid 29 connected to a suitable source of positive potential and a suppressor grid 30 connected directly to the cathode 27.

For the purpose of rendering the apparent impedance of the discharge device 25 reactive in nature, I have shown connected between the anode 26 and cathode 27 of the device 25 a condenser 31 and resistor 32 in series circuit relation. The control grid 28 of the discharge device 25 is connected through a blocking condenser 33 to a point intermediate the condenser 31 and resistor 32. It is well understood by those skilled in the art that the condenser 31 and resistor 32 serve as a phase shifting device such that the alternating potential across the resistor 32, which in this instance is applied between the cathode 27 and control grid 28 of the discharge device 25, is alvanced in phase with respect to the total potential appearing across the serially connected condenser 31 and resistor 32 and, hence, between the anode and cathode of the device 25. Furthermore, since the anode current in the discharge device 25 is in phase with the potential upon the control gird 28, it is evident that the anode current is advanced in phase with respect to the anode voltage, and accordingly that the discharge device 25 appears from the input end as a capacitance connected between the anode 11 of the discharge device 10 and ground. It is also well understood by those skilled in the art that the magnitude of this apparent capacitance is given by the equation:

$$C = g_m R_1 C_1$$

where $g_m$ is the mutual conductance of the discharge device 25 and $R_1$ and $C_1$ are the values of the resistance 32 and capacitance 31, respectively.

A suitable negative bias potential for the control grid 28 of the electron discharge device 25 is derived from the anode circuit of the electron discharge device 10 through the diode rectifier 12, 16, as clearly shown at Fig. 2. At Fig. 2, the diode elements 12 and 16 within the envelope of the electron discharge device 10 of Fig. 1 have been shown as a separate diode comprising the anode 16 and cathode 12. This diode is connected to rectify the alternating potential appearing across the condensers 20 and 21 in series circuit relation, the cathode 12 being grounded as shown. The rectified unidirectional potential appearing upon the anode 16 is impressed across a load resistor 34 and, as may be observed from Fig. 2, the diode rectifier is so disposed in the circuit that the ungrounded end of the load resistor 34 is negative with respect to ground. The negative unidirectional potential across the resistor 34 is impressed between the cathode 27 and the control electrode 28 of the electron discharge device 25 through a low pass filter including a resistor 35 and a condenser 36 and, from the filter through a modulating transformer 37 and a radio frequency choke coil 38. The modulating transformer 37 includes a primary winding 39 upon which is impressed from a suitable source a signal modulating voltage having an instantaneous intensity varying in accordance with the desired signal. The circuit elements described in connection with Fig. 2 have been assigned the same reference numerals as corresponding elements at Fig. 1, and may be easily identified on Fig. 1.

In normal operation of the apparatus shown at Fig. 1, modulating potentials appearing upon the primary winding 39 of the transformer 37 are superposed upon the grid bias potential derived from the diode rectifier 16, 12 in the envelope of the discharge device 10. In this manner, the instantaneous grid potential and, hence, the anode current of the reactance device 25 vary at signal frequency and in accordance with the impressed signal. It is well known that the mutual conductance $g_m$ of a grid control discharge device varies in accordance with the anode current. Accordingly, from the formula above, it will be evident that the apparent capacity of the electron discharge device 25 varies in accordance with the signal potential impressed upon the control electrode 28. Since the discharge device 25 functions as a reactive element in the frequency determining circuit of the oscillatory discharge device 10, the instantaneous frequency of oscillation of the discharge device 10 is modulated in accordance with signal potentials appearing across the transformer winding 39.

To illustrate the manner in which my new and improved grid bias circuit for the reactance discharge device 25 compensates for variations in voltage of the battery 17, let it be assumed that the voltage of the battery decreases below its desired value. Such decrease in battery voltage reduces the plate or anode potential of both the oscillatory discharge device 10 and the reactance discharge device 25, since for direct current these devices are connected across the battery terminals in parallel circuit relation. Without the benefit of my invention the reduced anode potential of the reactance discharge device 25 would reduce its anode current, and hence its mutual conductance $g_m$, thereby to reduce the apparent capacity of the device 25 and increase the frequency of oscillation of the electron discharge device 10. If this change in capacity of the electron discharge device 25 were left uncorrected, the net result would be a variation or drift of the mean or center unmodulated frequency of the oscillatory device 10. According to my invention, however, any tendency of the reduced anode potential of the electron discharge device 25 to decrease the apparent capacity of the device is counteracted by a change in the negative grid bias potential derived from the output circuit of the oscillatory electric discharge device 10. The manner in which this is accomplished may be observed at Figs. 1 and 2, where it appears that any reduction of anode potential on the discharge devices 10 and 25 resulting from a decrease in battery voltage not only tends to reduce the conduction of the reactance device 25, but also actually reduces the intensity of oscillations in the anode circuit of the oscillatory discharge device 10. Upon the reduction in intensity of oscillations appearing across the condensers 20 and 21 without changing their frequency, the rectifier unidirectional potential across the diode load resistor 34 is diminished, thereby to reduce in intensity the negative bias upon the reactance tube 25, tending to increase its conduction to compensate for the reduction of voltage upon the anode 26. In this manner, the conduction of the discharge device 25 is maintained substantially independent of changes in the battery voltage, so that the apparent capacity of the device 25 and the frequency of oscillation of the discharge device 10 are unaffected by battery voltage variations.

From the foregoing explanation, it will now be evident that I have provided a new and improved arrangement for rendering the frequency of oscillation of a reactance tube controlled electronic oscillator substantially independent of at least normal voltage variations of the unidirectional current supply source. By this arrangement, such oscillators are rendered particularly applicable to portable radio transmiting and receiving apparatus in which batteries are used as the source of unidirectional current supply.

While my invention has been shown for the purpose of illustration only as a frequency modulation signal generator for a portable radio transmitter, it will be understood that it is equally applicable wherever an oscillation generator is used, whether it be in a transmitting or receiving apparatus, and without regard to whether or not a characteristic of the generated oscillations is modulated. For example, my invention is well suited for application to the local oscillator of a superheterodyne radio receiving apparatus.

Furthermore, while I have shown and described only one embodiment of my invention by way of illustration, many modifications will occur to those skilled in the art and I therefore wish to have it understood that I intend in the appended claims to cover all such modifications as fall within the true spirit and scope of my invention.

What I claim as new and desire to secure by Letters Patent of the United States, is:

1. An oscillation generator comprising an electron discharge device, an anode circuit for said discharge device including a tuned circuit and a source of unidirectional current supply subject to voltage variation, means for generating electric oscillations in said device at a frequency determined by the resonant frequency of said tuned circuit, a second electron discharge device having an anode circuit connected in frequency determining relation with said tuned circuit and including a cathode and a control electrode, and means for deriving solely from the anode circuit of said first discharge device and applying between said cathode and said control electrode a negative unidirectional bias potential proportional in intensity to the voltage of said unidirectional current supply source, thereby to render the frequency of said oscillations substantially independent of voltage variations of said source.

2. In combination, means for generating electric oscillations comprising an electron discharge device having a frequency determining output circuit, said circuit including a source of unidirectional current supply subject to voltage variation, a second electron discharge device having an anode, a cathode and a control electrode and connected as a reactive element of said frequency determining circuit, and means for deriving solely from said output circuit and applying to said control electrode a negative unidirectional bias potential proportional to the voltage of said supply source thereby to render the anode current and the effective reactance of said discharge device substantially independent of voltage variations of said source.

3. An oscillation generator comprising an electron discharge device including an anode, a cathode and a control electrode, a parallel tuned circuit and a source of unidirectional current supply subject to voltage variations connected in series circuit relation between said anode and said cathode, means including said control electrode for generating electric oscillations in said discharge device at a frequency determined by the resonant frequency of said parallel tuned circuit, a second electron discharge device including an anode, a cathode and a control electrode connected to said supply source and as a reactive element for determining said resonant frequency, the effective reactance of said second electron discharge device being a function of its anode current, and a unidirectional conducting device connected to rectify at least a portion of the electric oscillations in the anode circuit of said discharge device and to supply between the cathode and control electrode of said second electron discharge device a negative unidirectional bias potential derived solely from said oscillations and proportional in intensity to the intensity of said oscillations.

4. An oscillation generator comprising an electron discharge device having an anode, a cathode and a control electrode, a parallel tuned circuit and a source of unidirectional current supply subject to voltage variation connected in series circuit relation between said anode and said cathode, said parallel tuned circuit comprising an inductance and at least two series connected condensers connected in parallel circuit relation therewith, means including said control electrode for generating electric oscillations in said discharge device at a frequency determined by the resonant frequency of said tuned circuit, a second electron discharge device including an anode, a cathode and a control electrode connected to said supply source in parallel circuit relation with said first electron discharge device, resistance-capacity phase shifting means connected between the anode, cathode and control electrode of said second electron discharge device to render said second discharge device a frequency determining element of said parallel tuned circuit, and a unidirectional conducting device for rectifying oscillations appearing across one of said series connected condensers and supplying between the cathode and control electrode of said second electron discharge device a negative unidirectional bias potential proportional in intensity to the intensity of said oscillations.

ARTHUR W. SEAR.

REFERENCES CITED

The following references are of record in the file of this patent:

UNITED STATES PATENTS

| Number | Name | Date |
|---|---|---|
| 2,280,527 | Kimball | Apr. 21, 1942 |
| 2,209,507 | Campbell | July 30, 1940 |
| 2,265,016 | White | Dec. 2, 1941 |
| 2,243,524 | Deal | May 27, 1941 |
| 2,250,526 | Franke | July 29, 1941 |
| 2,369,954 | Downey | Feb. 20, 1945 |
| 2,312,079 | Crosby | Feb. 23, 1943 |